United States Patent [19]

Metcalf

[11] Patent Number: 4,977,794
[45] Date of Patent: Dec. 18, 1990

[54] FLYWHEEL

[75] Inventor: Jeffrey D. Metcalf, Albion, Ill.

[73] Assignee: Roadmaster Corporation, Olney, Ill.

[21] Appl. No.: 350,216

[22] Filed: May 11, 1989

[51] Int. Cl.⁵ .................... G05G 1/00; F16F 15/10
[52] U.S. Cl. ................................. 74/572; 74/574
[58] Field of Search ........................... 74/572–574

[56] References Cited

U.S. PATENT DOCUMENTS

| 1,230,205 | 6/1917 | Nichols | 74/574 |
| 1,235,153 | 7/1917 | Osaki | 74/572 |
| 1,451,818 | 4/1923 | Forster | 74/572 |
| 2,474,370 | 6/1949 | Russell | 74/572 |
| 3,485,037 | 12/1969 | Clerk | 74/572 X |
| 4,020,937 | 5/1977 | Winter | 74/572 X |
| 4,138,286 | 2/1979 | Chevrolat et al. | 74/572 X |
| 4,208,921 | 6/1980 | Keyes | 74/572 |

FOREIGN PATENT DOCUMENTS

| 2504831 | 8/1975 | Fed. Rep. of Germany | 74/572 |
| 0200831 | 11/1983 | Japan | 74/572 |

Primary Examiner—Vinh T. Luong
Attorney, Agent, or Firm—Polster, Polster and Lucchesi

[57] ABSTRACT

An exercise bicycle flywheel (1) comprises a pair of facing concave sheet metal discs (15A, 15B). The space defined between the discs is filled with a heavy material (M) which is a mixture of hematite chips, magnetite powder, hydrated lime, portland cement, and water.

7 Claims, 2 Drawing Sheets

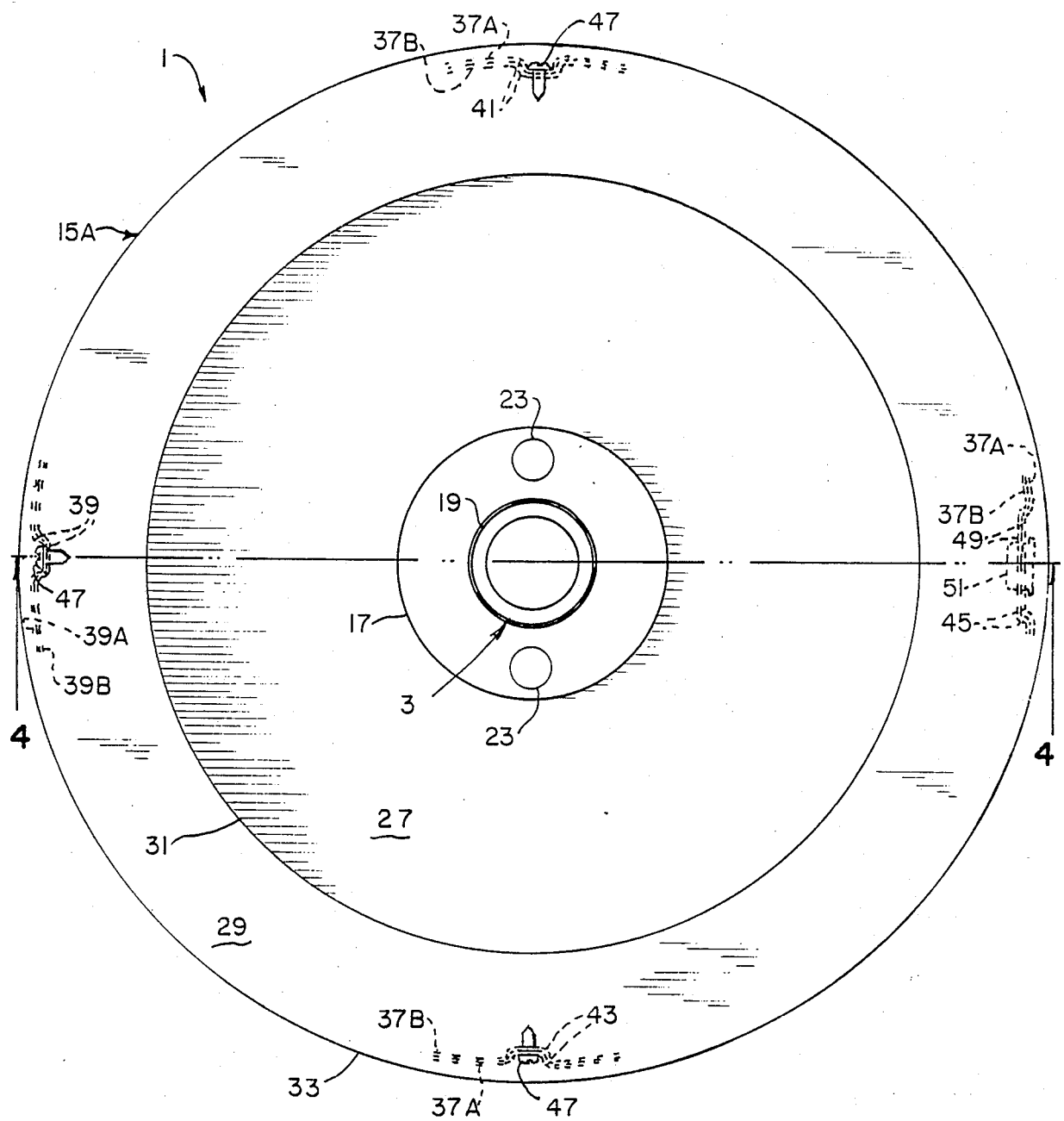
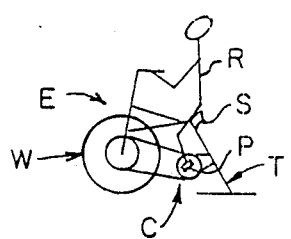
FIG. 1.
FIG. 2.

FLYWHEEL

BACKGROUND OF THE INVENTION

1. Field of the Invention

This invention relates to exercise equipment, and more particularly, to a weighted flywheel for use on exercise bicycles.

2. Description of the Prior Art

Exercise bicycles benefit the user by improving cardio-vascular fitness, enhancing body tone and engendering an overall sense of well being. Typically, the user exercises by pedaling a predetermined amount of time, or pedaling the equivalent of a distance indicted on an odometer. Also, the user may simulate pedaling up an incline by adjusting calipers or a tension belt on a wheel or the gear ratio between a sprocket and the wheel. Whichever mechanism is used, the effect is to increase the amount of work required by the user.

While many exercise bicycles use a wheel similar to that found on conventional bicycles, it is also advantageous to replace this type wheel with a flywheel. One function of a flywheel is to damp out any fluctuations which occur during a sequence of pedaling strokes by the user. For this purpose, the flywheel needs to have weight. It has been customary heretofore to use a cast iron flywheel, but these have not been made where the exercise bicycle is assembled, and they have been expensive to ship. Heavy steel shells have also been used, welded together radially inboardly of an outside rim, but they have been difficult to form and expensive because of their weight.

One of the objects of this invention is to provide an exercise bicycle flywheel that is less expensive to manufacture and assemble than such flywheels known heretofore.

Another object is to provide such a flywheel that is unaffected by heat generated by a brake or drag during use of the exercise bicycle.

Other objects and features will be apparent to those skilled in the art in the light of the following description and accompanying drawings.

SUMMARY OF THE INVENTION

In accordance with this invention, generally stated, an exercise bicycle is provided with a flywheel assembled from a pair of light-weight, interlocking sheet metal discs which form a hollow shell; the shell is filled with a heavy, fluent material, giving the desired weight to the flywheel, and the material is allowed to set or harden after the shell is filled, thereby stabilizing the material. The resultant flywheel is low in cost, easy to manufacture and easy to assemble.

Briefly, an exercise bicycle flywheel comprises a pair of facing concave sheet metal discs. The spaced defined between the discs is filled with a heavy, fluent material which is capable of setting and is allowed to set.

BRIEF DESCRIPTION OF THE DRAWINGS

FIG. 1 is a representation of an exercising bicycle with which the present invention may be used;

FIG. 2 is a side elevation view of a flywheel;

Corresponding reference characters represent corresponding parts throughout the several views of the drawings.

DESCRIPTION OF A PREFERRED EMBODIMENT

Referring to FIG. 1, an exercise bicycle E is used by a rider R to exercise. As with a conventional bicycle, the rider sits upon a seat S and using pedals P (only one of which is shown), drives a chain C and sprocket mechanism to turn a wheel W. The exercycle typically has a stand T for balancing the exercycle; since, unlike a bicycle, an exercycle usually has only one wheel.

Figure 3:
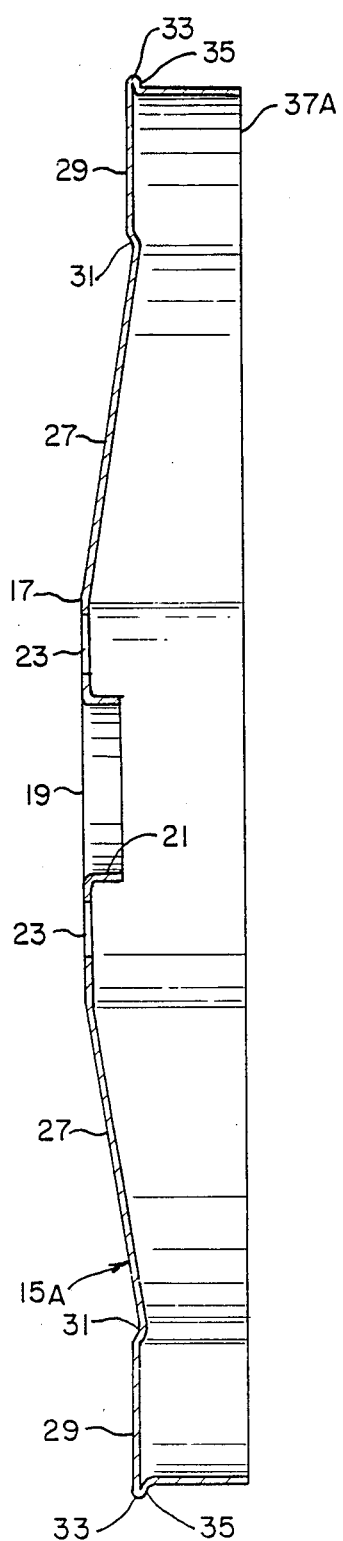
FIG. 3 is a sectional view of the disc forming one-half of the flywheel shell; and, FIG. 4 is a sectional view taken along line 4—4 in FIG. 2.
Figure 4:
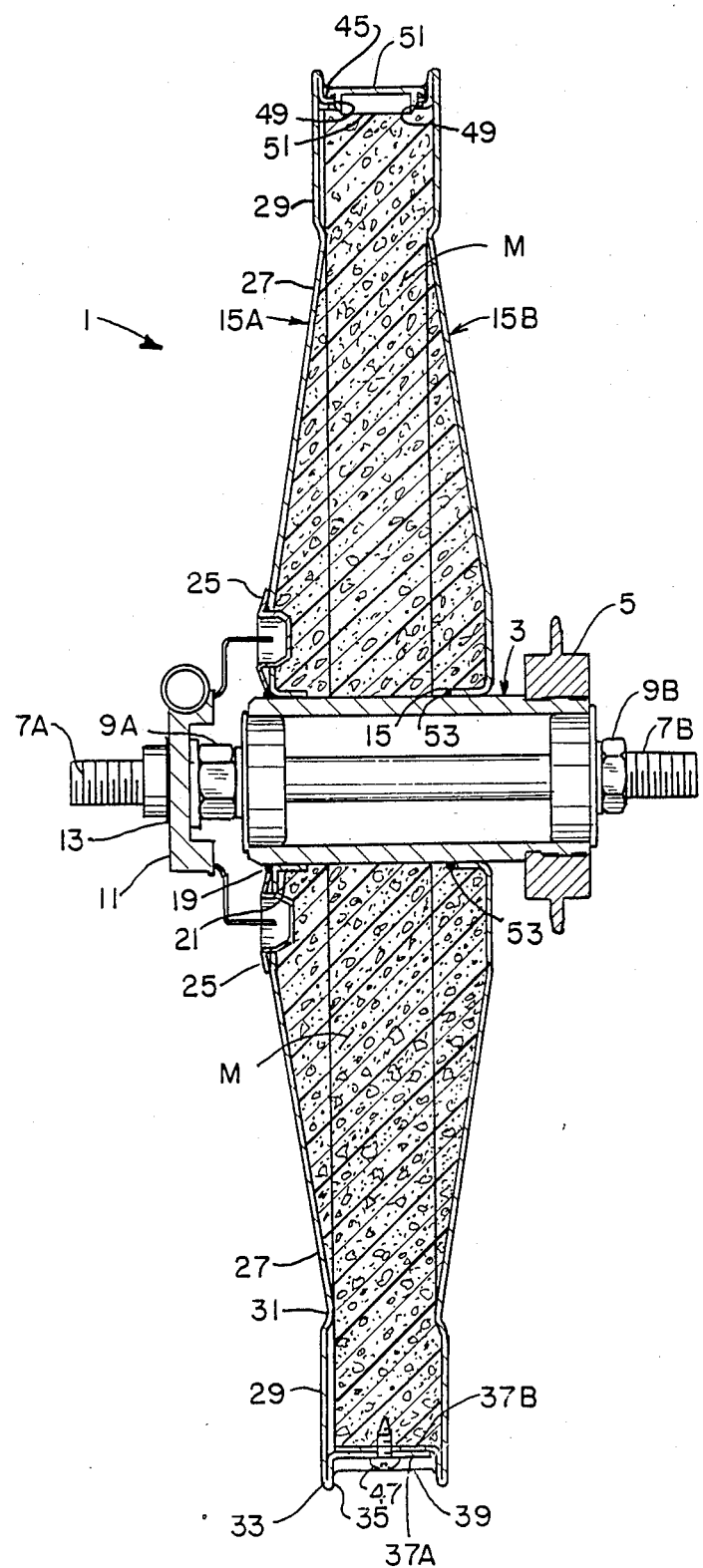

While wheel W may be a spoke and rim type wheel, such as shown in FIG. 1, and which is found on most conventional bicycles, wheel W may be substituted for with a flywheel 1 of the present invention. Referring to FIG. 4, the flywheel is mounted on a hub 3. The hub carries a conventional toothed sprocket 5 driven by chain C. The hub assembly has opposed, outwardly extending threaded shafts 7A and 7B. Nuts 9A and 9B are threaded onto the respective shafts. A rotating collar 11 carrying a speedometer drive 13 fits on shaft 7A.

Referring to FIGS. 2 and 4, flywheel 1 is comprised of a pair of concave sheet metal discs 15A and 15B respectively. The discs can be made of light gauge metal, for example sixteen gauge steel. Since both discs are similar in construction, only the disc 15A shown in FIG. 2 will be described in detail. Disc 15A has a substantially flat, annular central section 17. A central opening 19 is formed in the section, the diameter of this opening corresponding to the outer diameter of hub 3 for the disc to mount on the hub. A portion of section 17 surrounding opening 19 is inwardly turned to form a circumferential collar 21. A pair of diametrically opposed holes 23 are formed radially outwardly from the center of opening 19. Snap-in seats 25 are fitted in these holes. The seats are cup-shaped and the respective ends of a speedometer drive 13 are inserted into the seats during assembly of the flywheel on the hub. (See FIG. 4). There are no corresponding openings formed in disc 15B.

Outwardly of section 17, disc 15A has a circumferential, inwardly sloping section 27 which extends radially outwardly to an outer, circumferential flange 29. The flange is also substantially flat but has an outwardly turned transition area 31 with section 27. At the radial outer edge 33 of the disc, the sheet metal is folded back over on itself to form a lip 35, which serves to retain a tension belt. The sheet metal is then turned inwardly to form a cylindrically shaped circumferential rim or collar 37A.

As shown in FIG. 4, the outer diameter of rim 37B of disc 15B is substantially equal to the inner diameter of rim 37A of disc 15A. This allows rim 37B to nest or fit within rim 37A when the discs are fitted together to form the flywheel. Further, as shown in FIG. 2, each rim has four corresponding indentations (39, 41, 43 and 45) equidistantly spaced about the rims. These permit an interlocking fit of the discs. Indentations 39, 41 and 43 each have holes formed there through to accommodate machine screws 47. A larger diameter hole 49 is formed in the indentation 45 in each rim 37A and 37B. After the discs are fitted together, a heavy material M is poured through the opening 49 to fill the inner space defined by the discs.

One illustrative form of heavy material, but one that has been found eminently satisfactory and that constitutes the preferred embodiment of the material, is made up as follows, in parts by dry weight:

Hematite chips: 69
Magnetite powder: 18
Hydrated lime: 3
Portland cement: 10

To which is added

Water reducer: 10–25 oz. per 100 lb. cement
Water: As needed

The function of the magnetite powder is chiefly to increase the density and to float the hematite chips which are the principal ingredient. The important function of floating the hematite chips can be performed by other heavy, finely powdered minerals, but magnetite is available and effective. The hydrated lime is used as a plasticizer, to improve flowability and also acts to prevent water separation during the curing phase. The Portland cement is a binder. The water reducer (super plasticizer) reduces the amount of water needed to produce a free-flowing mixture. The material may easily be poured through opening 49, which may be on the order of 0.75 inches in diameter, for example. After filling, a plug 51 is inserted through the opening to seal the material inside the flywheel, and the material is allowed to set.

The assembly process is such that disc 15B is first installed on hub 3. The radial inner edge of the disc, which fits snugly enough to preclude leakage of the fluent filler material, is then welded to the hub as indicated at 53. While two such weld spots are shown in FIG. 4, the radial inner edge of the disc is typically welded at three points. Next, disc 15A is installed on the hub and rotated so the corresponding indentations in rims 37A and 37B are aligned for interlocking fit of the discs. The radial inner edge of disc 15A may also be welded to hub 3 at three spots indicated 55 in FIG. 2, or the disc can be pressed onto the hub in a press fit. Screws 47 are screwed into the holes through indentations 39, 41 and 43. Seats 25 are snap fitted into openings 23 in disc 15A. The material M is then poured through opening 49 in indentation 45 to give weight to the flywheel. Plug 51 is next inserted in opening 49 and the material allowed to set. Thereafter, the remainder of the parts are installed on the hub to complete the assembly.

The flywheel can be painted or chrome plated and, if desired, can be given the same appearance as conventional cast iron flywheels.

Numerous variations in the construction of the flywheel of this invention, within the scope of the appended claims, will occur to those skilled in the art in the light of the foregoing disclosure. Merely by way of example, the configuration of the flywheel can be changed, and the particular ways in which the parts are secured to one another can be changed. The discs can be made of aluminum or other metal, and can be made of different gauges, preferably the lightest gauge that will not distort, that can accommodate the drag or brake system and that can be secured to the hub, the filler serving to maintain the form of the wheel in those areas in which the filler is in place and set. The filler material can be differently composed, as suggested in the description of the preferred embodiment of the material M, or the same materials can be differently treated, as by grinding the hematite, for example, as long as the filler is heavy enough, settable, and, like the metal shells of the wheel, unaffected by the amount of heat generated by the brake or drag mechanism in use.

What is claimed is:

1. An exercise bicycle flywheel comprising a pair of facing, concave sheet metal discs, the space defined between said discs being filled with a material, each disc having a central opening for mounting the flywheel on a hub, the opening comprising a radial inner edge of each disc which is in a material-tight relation to said hub, an inwardly turned circumferential rim at the radial outer edge of the disc, the outer diameter of the rim of one disc being substantially equal to the inner diameter of the rim of the other disc for the first said rim to fit within the second said rim with the rims having a plurality of corresponding indentations equidistantly spaced therearound for the rims to interlockingly fit, a hole being formed in the corresponding indentation in each rim for the material to be poured into the space between the discs after they are fitted together, and a plug fitting in the holes after the material has been poured into the space.

2. The flywheel of claim 1 wherein at least one of said discs is welded to the hub at its inner edge.

3. The flywheel of claim 1 further including attachment means for attaching the discs together, the attachments being made at each of the other indentations.

4. The flywheel of claim 1 wherein each of said discs is welded at its radially inner edge and unwelded at its outer radially outer edge.

5. The flywheel of claim 1 wherein the material in the said space in initially flowable plastic and thereafter set.

6. The flywheel of claim 1 wherein said heavy material is principally hematite.

7. An exercise bicycle flywheel comprising a pair of facing concave sheet metal discs, the space between the discs being filled with a fluent material consisting essentially, in parts by dry weight of:

Hematite chips: 69
Magnetite powder: 18
Hydrated lime: 3
Portland cement: 10 to which is added:

Water reduced: 10–25 oz. per 100 lb. cement
Water: as needed.

* * * * *